May 17, 1966 A. P. HULTGREN 3,251,462

WRAP-AROUND AND PRESSURE LOCK FOR TAPE REELS

Filed Dec. 2, 1963

Inventor:
Arnold P. Hultgren
By Bair, Freeman & Molinare
Attys.

United States Patent Office 3,251,462
Patented May 17, 1966

3,251,462

WRAP-AROUND AND PRESSURE LOCK FOR TAPE REELS

Arnold P. Hultgren, River Forest, Ill., assignor, by mesne assignments, to Amerline Corporation, a corporation of Illinois Filed Dec. 2, 1963, Ser. No. 327,333
5 Claims. (Cl. 206—52)

This invention relates to a cover for tape reels and it particularly relates to a tape reel cover which cooperates with the tape reel itself to provide a substantially dust-proof storage for computer tape.

In the storage of computer or magnetic tape, it is important that the tape be maintained substantially dust-free during storage, since even minute particles of dust on the tape will result in inaccurate output of information. As a result, it is common practice to store computer tape reels in containers or cans which completely enclose the tape reel; ordinarily, such storage containers are provided with such things as gasket means to insure dust-free storage of the tape. Although these storage containers are effective for protecting the tapes from contact with dust particles, they are rather complex in design and expensive to manufacture.

One type of less complex and less expensive cover proposed for providing substantially dust-free storage for computer tape is set forth in the Morrison Patent No. 3,095,969. However, this device is adapted to cover only the space between the flanges of the tape reel and no means are provided for covering the openings or apertures, commonly provided in the flanges of tape reels. Generally, such openings are provided for various reasons; one reason often given for providing these apertures is to permit the egress of air during the winding of the tape on the reel, and another reason is to permit access to the hub of the reel in order to thread or anchor the tape thereon. Actually, it is not of present importance to explain the reasons for providing such apertures, as it is an important object of this invention to provide substantially dust-free storage for computer tapes stored on a tape reel when the flanges of the reel include openings therein.

It is also an object of this invention to provide a tape reel cover for providing substantially dust-free storage of computer tape on tape reels, wherein the cover is substantially less expensive and less bulky than complete enclosures, commonly provided for storing tape on reels.

It is a further object of this invention to provide a device for storing computer tape on a reel, wherein a wrap-around member is adapted to substantially cover the space between the flanges of the reel and inwardly projecting flaps or fingers are adapted to cover the openings in the flanges for providing dust-free engagement therebetween.

It is another object of this invention to provide a tape reel cover for cooperating with the reel for substantially preventing the ingress of air to the tape stored on the reel, wherein the tape reels, with covers thereon, are adapted to be stored in a stacked condition.

Further purposes and objects of this invention will appear as the specification proceeds.

A particular embodiment of the present invention is illustrated in the accompanying drawings wherein.

Figures 1, 2:
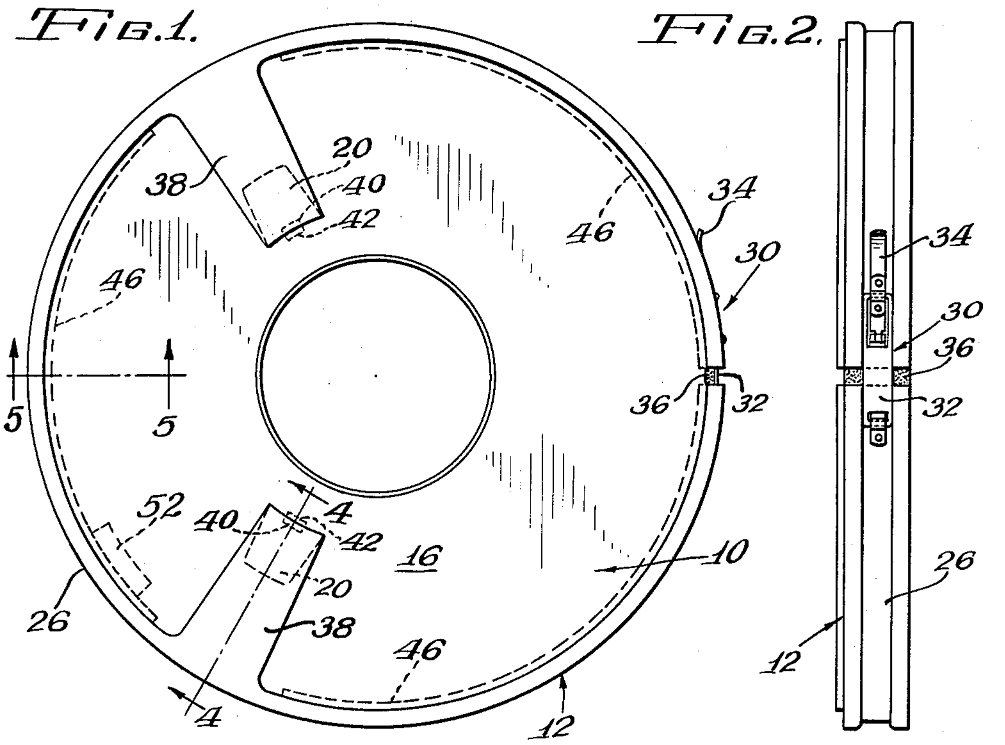
FIGURE 1 is a top plan view of my cover device for a computer tape reel, in place on a cooperating tape reel, for providing substantially dust-free storage of computer tape.
FIGURE 2 is a side elevational view of the embodiment of FIGURE 1.
Figure 4:
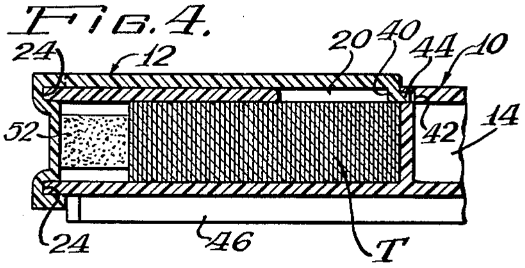
FIGURE 4 is an enlarged sectional view, taken along the line 4—4 of FIGURE 1.

Referring to the drawings, a tape reel 10 is shown in cooperating relationship with cover member 12, for maintaining computer or magnetic tape T in a substantially dust or dirt-free condition during the storage thereof.

The tape reel 10 is provided with a hub, generally indicated at 14, and a pair of spaced, susbtantially parallel flanges 16 extending outwardly from the hub 14; the flanges 16 have a generally circular outer periphery 18. The tape T is adapted to be wound continuously around the hub 14 and between the side-supporting flanges 16 of the reel 10. As shown in FIGURE 1, one or more openings 20 are provided in one of the flanges 16; as previously mentioned, the openings 20 are commonly provided in tape reels for a variety of reasons; my cover device 12 provides means for substantially preventing the ingress of dirt particles through the openings 20.

The cover or enclosure member 12 is generally cylindrical in shape, when locked in place on a tape reel 10, and substantially conforms to the outer periphery 18 of the flanges 16 of the reel 10. The cover 12 is also provided with a pair of substantially parallel, longitudinal grooves 24, which are spaced from each other on the central or wrap-around portion 26 of the cover 12. The spaced grooves 24 are adapted to snugly receive the outer edges of the flanges 16 in order to substantially prevent the passage of air-carried dust particles between the edges of the flanges 16 and the cover member 12.

Figure 3:
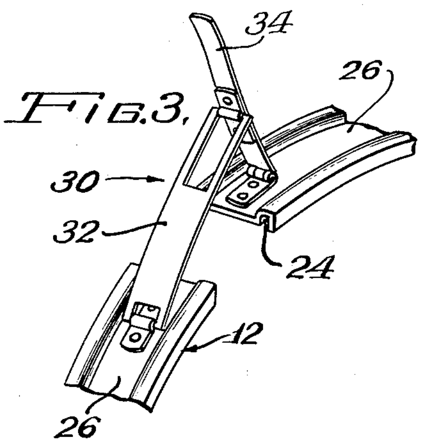
FIGURE 3 is an enlarged perspective view of the means utilized for locking the opposite ends of the tape reel together in a dust-sealing condition.

In order to maintain the opposite ends 28 of the wrap-around portion 26 in substantially dust-sealing relationship, a latch or locking means 30 may be provided. The means 30 includes a connecting arm 32 pivotably mounted to the outer surface of the wrap-around portion 26, at one end thereof, and an actuating lever 34, also pivotably mounted to the outer surface of the wrap-around portion 26, at the other end of the wrap-around 26; the arm 32 is pivotably anchored to the upper or outer surface of the actuating lever 34 at a point intermediate the outer end of the lever 34 and the pivot point of the lever 34. Referring to FIGURE 3, the latch means 30 is shown in the open position and upon pivoting of the lever arm 34 towards and against the wrap-around portion 26, the connecting arm 32, which is pivotably anchored to one end of the wrap-around portion 26 causes the two ends to be drawn inwardly towards each other to thereby provide substantially dust-sealing engagement therebetween. When the lower surface of the actuating lever 34 is in substantial contact with the outer surface of the wrap-around portion 26, the cover device is in a locked condition. In order to assure sealing engagement between the opposite ends of the wrap-around 12, as shown in FIGURE 2, a resilient gasket 36 is adhesively secured to one of the ends 26 whereby upon drawing of the ends of the wrap-around together by the latch means 30, the gasket 36 is squeezed therebetween and provides sealing engagement between the opposite ends of the wrap-around portion.

As it is important that the tape be maintained in dust-free condition during storage, the openings 20, provided in the flanges 16, must be covered. Therefore, I provide fingers or flaps 38 projecting inwardly from one side of the wrap-around portion 26 of the cover member 12 for covering the openings 20. The flaps 38 have their lower surfaces in substantial engagement with the portions of the flanges 16 which surround the openings 20. In order to provide a positive engagement between the flaps 38 and the openings 16, cooperating locking means are provided in the reel 10, at the hub 14, and on the flaps 38. The free end of each of the flaps 38 includes a depending L-shaped or hooked portion 40 which is adapted to have its lower arm 44 inserted into locking engagement with a depression 42 provided in the reel 10 at a point adjacent each opening 20 in the flanges 16. The depressions 42 may be located centrally of the openings 20 at the side thereof which is adjacent the hub 14; each depression 42 thus receives the lower arm or projection 44 of the hooked portion 40 of the flap 38. Thus, means are not only provided for enclosing the space between the outer edges of the flanges 16, but means are also provided for covering the apertures 20 provided in the tape reel flanges 16.

Figure 5:
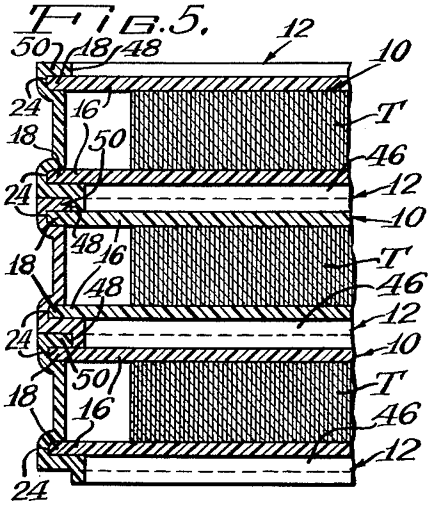
FIGURE 5 is an enlarged sectional view, taken along the line 5—5, showing a plurality of tape reels, with covers, in a stacked condition.

When a cover member 12 is placed in cooperating relationship with a tape reel 10, then is stored, it is advantageous that the covers 12 be so constructed that they may be stored in a stacked relationship, as illustrated in FIGURE 5. For this purpose, on the side of the cover members 12, which is opposite to the side on which the inwardly projecting flaps 38 are located, a downwardly extending intermittent ridge 46 is provided. The ridge 46 is adapted to telescope within the inner edge 48 of the outer wall 50, which forms one side of a groove 24. The ridge 46 is intermittent or discontinuous since it is adapted to span the covering flaps 38, as illustrated in FIGURE 1.

Furthermore, since it is desirable to maintain the tape T in place on the reel without loosening thereof during storage, a resilient sponge-like retaining member or mass 52 is adhesively mounted on the inner surface of the wrap-around 26 and is adapted to firmly engage the outermost portion of tape stacked on the reel 10. The retainer 52 is desirably made of foam rubber or a foam plastic material.

In the use of the cover member 12, when it is desired to store computer tape T on a tape reel 10, the cover member 12, while in the open or unlatched position, is dropped on or placed over both flanges 16. At this time, the hooked portions 40 on the covering flaps 38 are directed towards a general alignment with the depressions 44, provided adjacent the openings 20. Then, the lower part 44 of each hooked portion 40 is inserted into the depressions 42, and the grooves 24 are inserted on to the outer edges of the flanges 16. The latch means 30 is then pivoted downwardly in order to draw the opposite ends of the wrap-around portion 22 together and provide a dust-free sealing between the ends, while squeezing the gasket 36 therebetween.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. Apparatus enclosing tape stored upon a tape reel in substantially dust free condition and wherein said reel includes a hub and flanges which project outwardly from said hub, at least one of said flanges having an opening therein, said apparatus comprising a cover member having a wrap-around portion substantially conforming to the outer periphery of said flanges and substantially enclosing the space formed therebetween, a pair of spaced grooves extending around the inner periphery of said wrap-around portion receiving the outer edges of said flanges, means for drawing the opposite ends of said wrap-around portion together in dust sealing relationship, flap means projecting inwardly from said wrap-around portion and being integral therewith, said flap means covering each opening in said flanges, a hooked portion depending from the free end of each of said flap means, and a depression in each of said flanges and adjacent each of said openings receiving each of said hooked portions, whereby each flap means in maintained in firm engagement over each of said openings to thereby substantially enclose each of said openings and maintain said tape in dust free storage.

2. Apparatus enclosing tape stored on a tape reel in a substantially dust free condition and wherein said reel includes a pair of spaced flanges, at least one of which having at least one opening therein, said apparatus comprising a cover member having a wrap-around portion substantially conforming to the outer periphery of said flanges and enclosing the space formed therebetween to thereby substantially prevent the ingress of air between said flanges and said wrap-around portion, means for drawing the opposite ends of said wrap-around portion together in dust-sealing relationship, integral flap members projecting inwardly from said wrap-around portion covering each opening in each of said flanges and cooperating means adjacent the openings in each of said flanges and on said flap members maintaining said flaps in firm engagement over each of said openings, to thereby substantially enclose each of said openings and maintain said tape in dust free storage.

3. In combination, a cover and a tape reel, said reel having at least one opening in one of the flanges thereof, said cover comprising a wrap-around portion substantially conforming to the outer periphery of said flanges, means drawing the opposite ends of said wrap-around portion together in a dust-sealing relationship and a flap projecting inwardly from said wrap-around portion covering said opening in said flange to thereby maintain the tape on said reel substantially dust-free during storage on said reel.

4. The combination of claim 3 wherein said wrap-around portion includes a pair of spaced grooves on the inner periphery thereof for receiving the outer edges of said flanges in order to substantially prevent the ingress of dust between said wrap-around portion and said flanges.

5. The combination of claim 3 wherein a gasket is positioned between the opposite ends of said wrap-around portion assuring dust-sealing engagement between said opposite ends, and a resilient mass is mounted on the inner surface of said wrap-around portion maintaining said tape firmly in place on said reel.

References Cited by the Examiner

UNITED STATES PATENTS

| | | | |
|---|---|---|---|
| 1,461,029 | 7/1923 | Doty | 206—52 |
| 2,172,675 | 9/1939 | Goldberg | 206—53 |
| 2,330,278 | 9/1943 | Gordon | 206—59 |
| 2,765,908 | 10/1956 | Kulka | 206—54 |
| 2,838,167 | 6/1958 | Kulka | 206—54 |
| 3,095,969 | 7/1963 | Morrison | 220—97 |

FOREIGN PATENTS 114,285 11/1941 Australia.

LOUIS G. MANCENE, *Primary Examiner.*

THERON E. CONDON, *Examiner.*